United States Patent
Hou

(10) Patent No.: US 10,252,736 B2
(45) Date of Patent: Apr. 9, 2019

(54) METHOD AND SYSTEM FOR CONTROLLING GRADE OF AUTOMATION OF TRAIN OPERATION

(71) Applicant: COORDEM TRANSPORT TECH. CO., LTD., Shenzhen, Guangdong (CN)

(72) Inventor: Mancang Hou, Shenzhen (CN)

(73) Assignee: COORDEM TRANSPORT TECH. CO., LTD., Shenzhen (CN)

( * ) Notice: Subject to any disclaimer, the term of this patent is extended or adjusted under 35 U.S.C. 154(b) by 0 days.

(21) Appl. No.: 15/779,077

(22) PCT Filed: Nov. 25, 2015

(86) PCT No.: PCT/CN2015/095516
§ 371 (c)(1),
(2) Date: May 24, 2018

(87) PCT Pub. No.: WO2017/088119
PCT Pub. Date: Jun. 1, 2017

(65) Prior Publication Data
US 2018/0339722 A1    Nov. 29, 2018

(51) Int. Cl.
*B61L 27/04*    (2006.01)
*B61L 25/02*    (2006.01)
(Continued)

(52) U.S. Cl.
CPC ........... *B61L 27/04* (2013.01); *B61L 15/0072* (2013.01); *B61L 25/025* (2013.01);
(Continued)

(58) Field of Classification Search
CPC .......... B60T 7/12; B60T 8/1705; B60T 8/172; B60T 8/3235; B60T 8/58; B60T 7/18;
(Continued)

(56) References Cited

U.S. PATENT DOCUMENTS 3,653,723 A * 4/1972 Worbois ................ B60T 13/665
303/20
3,784,983 A * 1/1974 Eckert, Jr. ................ G06F 13/12
714/806
(Continued)

FOREIGN PATENT DOCUMENTS

CN    101913370 A    12/2010
CN    101941452 A    1/2011
(Continued)

OTHER PUBLICATIONS

International Search Report for PCT/CN2015/095516 dated Sep. 1, 2016, 2 pages.

*Primary Examiner* — Behrang Badii
(74) *Attorney, Agent, or Firm* — METIS IP LLC

(57) ABSTRACT

A system for controlling grade of automation (GOA) of train operation includes an onboard information recording unit that is used to record a first set of GOAs; an onboard switch of GOA of train operation that is used to switch a value of GOA of train operation of the train; an onboard train positioning information acquisition unit that is used to collect current positioning information of the train; and an onboard controlling and processing unit that is used to determine a current GOA relating to the train.

12 Claims, 6 Drawing Sheets

(51) Int. Cl.
*B61L 27/00* (2006.01)
*G05D 1/00* (2006.01)
*B61L 15/00* (2006.01)
*F03D 7/02* (2006.01)
*B61L 23/14* (2006.01)
*B60T 7/12* (2006.01)
*F16H 57/04* (2010.01)
*B60T 8/17* (2006.01)
*B60T 8/172* (2006.01)
*H02P 25/18* (2006.01)
*F16D 48/06* (2006.01)

(52) U.S. Cl.
CPC ........ *B61L 27/0038* (2013.01); *G05D 1/0061* (2013.01); *G05D 1/0088* (2013.01); *B60T 7/12* (2013.01); *B60T 8/17* (2013.01); *B60T 8/172* (2013.01); *B61L 23/14* (2013.01); *F03D 7/0224* (2013.01); *F16D 48/06* (2013.01); *F16H 57/04* (2013.01); *G05D 2201/02* (2013.01); *H02P 25/18* (2013.01)

(58) Field of Classification Search
CPC ........ B60T 7/22; B60T 13/665; B60T 17/228; F16D 48/06; B61L 15/0072; B61L 25/025; B61L 27/0038; B61L 23/14; B61L 3/008; B61L 25/021; B61L 25/026; G05D 1/0061; G05D 1/0088; B60L 15/40; B60L 7/18; F16H 57/04; B61H 13/00; E05F 15/63; E05F 15/635; E05F 15/643; E05F 15/627; E05F 15/70; G06F 15/78; G06F 13/12; G06F 15/76
See application file for complete search history.

(56) References Cited

U.S. PATENT DOCUMENTS

| | | | | |
|---|---|---|---|---|
| 4,957,015 | A * | 9/1990 | Ishikawa | F16H 61/0272 477/116 |
| 5,092,188 | A * | 3/1992 | Fujikawa | B60K 23/0808 180/249 |
| 5,749,547 | A * | 5/1998 | Young | A63H 19/24 104/300 |
| 6,025,685 | A * | 2/2000 | Parsadayan | E05F 15/63 318/471 |
| 8,483,895 | B1 | 7/2013 | Beregi | |
| 2004/0210374 | A1* | 10/2004 | Werner | F16D 48/06 701/67 |
| 2013/0271056 | A1* | 10/2013 | Bunte | F03D 7/0224 318/503 |
| 2017/0305396 | A1* | 10/2017 | Shiratsuchi | B60T 7/12 |

FOREIGN PATENT DOCUMENTS

| | | |
|---|---|---|
| CN | 102225695 A | 10/2011 |
| CN | 104228887 A | 12/2014 |

\* cited by examiner

METHOD AND SYSTEM FOR CONTROLLING GRADE OF AUTOMATION OF TRAIN OPERATION

CROSS-REFERENCE TO RELATED APPLICATIONS

This present application is a continuation application of International Application No. PCT/CN2015/095516, filed on Nov. 25, 2015, the contents of which are hereby incorporated by reference to its entirety.

TECHNICAL FIELD

The present disclosure relates to control of train operation, and more particularly, to methods and systems for controlling grade of automation of train operation.

BACKGROUND

In controlling technology for train operation, Grade of Automation (abbreviation: GOA) described in the professional and technical data such as documental series IEC62290 may be a parameter to measure a degree of GOA of train operation. Five grades of functional requirements are described (e.g., in the Table1-Grades of automation in IEC62290-1:2006), the five grades are GOA0, GOA1, GOA2, GOA3, GOA4. However, there isn't any report about the implementation of technical proposal of GOA and no mention of how to achieve unified management of controlling the GOA of train operation to coordinate the difference of GOA of operation during the cross-line and cross-region operation service in the modern train operation.

SUMMARY

Embodiments of the present disclosure herein provide a method and a system for controlling GOA of train operation.

In a first aspect, the present disclosure provides a method for controlling GOA of train operation, an onboard controlling and processing unit, an onboard information recording unit, an onboard switch of GOA of train operation, and an onboard train positioning information acquisition unit may be installed on the train. The onboard information recording unit, the onboard switch for GOA of train operation, and the onboard train positioning information acquisition unit may be connected with the onboard controlling and processing unit, respectively. The method may include: obtaining, by the onboard controlling and processing unit, current positioning information of the train collected by the onboard train positioning information acquisition unit; obtaining, based on the current positioning information of the train and by the onboard controlling and processing unit, a set of GOAs of train operation recorded in the onboard information recording unit and supportable by a current track section where the train is located; obtaining, by the onboard controlling and processing unit, a set of GOAs of train operation recorded in the onboard information recording unit and supportable by the train itself; obtaining, by the onboard controlling and processing unit, a value of GOA of train operation corresponding to a current switch position of the onboard switch of GOA of train operation; determining, by the onboard controlling and processing unit, an intersection of the set of GOAs of train operation supportable by the current track section where the train is located and the set of GOAs of train operation supportable by the train itself; and determining a current GOA of train operation relating to the train by determining whether the value of GOA of train operation belongs to the intersection.

In a first embodiment, the determining the current GOA of train operation relating to the train by determining whether the value of GOA of train operation belongs to the intersection may include: if the value of GOA of train operation belongs to the intersection, determining that the value of GOA of train operation corresponding to the current switch position of the onboard switch of GOA of train operation is the current GOA of train operation relating to the train.

Combining the first aspect or the first possible embodiment of the first aspect, in a second possible embodiment, the determining the current GOA of train operation relating to the train by determining whether the value of GOA of train operation belongs to the intersection may include: if the value of GOA of train operation does not belong to the intersection, generating alarm information of abnormality of switch position selection relating to the onboard switch of GOA of train operation of the train.

Combining the first aspect or the first or the second possible embodiment of the first aspect, in a third possible embodiment, the alarm information may be used to trigger a stop of the train.

In a second aspect, the present disclosure may provide a system for controlling GOA of train operation. The system may include following units installed on the train: an onboard controlling and processing unit, an onboard information recording unit, an onboard switch of GOA of train operation, and an onboard train positioning information acquisition unit. The onboard information recording unit, the onboard switch of GOA of train operation, and the onboard train positioning information acquisition unit may be connected to the onboard controlling and processing unit, respectively. The system may include: the onboard information recording unit configured to record a set of GOAs of train operation supportable by a current track section where the train is located and a set of GOAs of train operation supportable by the train itself; the onboard switch of GOA of train operation configured to switch a value of GOA of train operation of the train; the onboard train positioning information acquisition unit configured to collect current positioning information of the train; the onboard controlling and processing unit configured to obtain the current positioning information of the train and obtain, based on the current positioning information of the train, the set of GOAs of train operation supportable by the current track section where the train is located; the onboard controlling and processing unit configured to obtain the set of GOAs of train operation recorded in the onboard information recording unit and supportable by the train itself and determine an intersection of the set of GOAs of train operation supportable by the current track section where the train is located and the set of GOAs of train operation supportable by the train itself; and the onboard controlling and processing unit configured to determine a current GOA of train operation relating to the train by determining whether the value of GOA of train operation belongs to the intersection.

In a first possible embodiment, if the value of GOA of train operation belongs to the intersection, the onboard controlling and processing unit may be specifically used to determine that the value of GOA of train operation corresponding to the current switch position of the onboard switch of GOA of train operation is the current GOA of train operation.

Combining the first aspect or the first possible embodiments of the first aspect, in a second possible embodiment, if the value of GOA of train operation does not belong to the intersection, the onboard controlling and processing unit may be specifically used to generate alarm information of abnormality of switch position selection relating to the onboard switch of GOA of train operation of the train.

Combining the first aspect or the first or the second possible embodiment of the first aspect, in a third possible embodiment, the alarm information may be used to trigger a stop of the train.

Combining the first aspect or the first or the second or the third possible embodiment of the first aspect, in a fourth possible embodiment, the onboard switch of GOA of train operation may be further configured to synchronously switch the train's input circuit for switching control of driving status, input circuit for external controlling of traction system, input circuit for external controlling of brake system, and/or input circuit for external controlling of train door.

As noted above, in some viable embodiments of the present disclosure, a technical proposal for determining current GOA of train operation may be disclosed, which solves the problems of the implementation of technical proposal of GOA of train operation and the unified management of GOA of train operation.

BRIEF DESCRIPTION OF THE DRAWINGS

In order to illustrate the technical proposal of the disclosure more clearly, embodiments are described in detail with reference to the drawings. Obviously, these drawings are non-limiting exemplary embodiments of the present disclosure. All other drawings obtained by persons having ordinary skill in the art based on the drawings of the present disclosure without creative efforts shall fall within the protection scope of the present disclosure.

DETAILED DESCRIPTION

Figure 1:
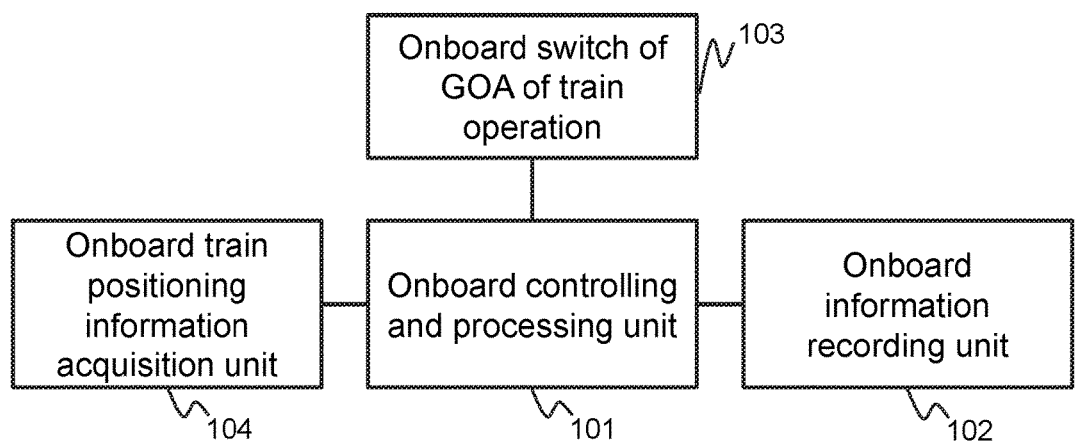
FIG. 1 is a schematic diagram illustrating an exemplary system for controlling GOA of train operation according to embodiments of the present disclosure.

For better understanding of the present disclosure, embodiments of the present disclosure will be described with reference to the drawings. It should be understood that embodiments described below are only a part of not all of the embodiments of the present disclosure. All other embodiments obtained by persons having ordinary skill in the art based on the embodiments of the present disclosure without creative efforts shall fall within the protection scope of the present disclosure.

The terms "first", "second", "third", or the like in the description and in the claims and in the figures, are used for distinction between similar elements and not necessarily for describing a sequential or chronological order. Furthermore, the term "comprise", "have", and any variants thereof may be intended to cover non-exclusive inclusions. For example, process, method, system, product, or device comprising a series of steps or units may be not limited to the listed steps or units, but may alternatively include steps or units that may be not listed, or alternatively may also include other steps or units inherent to the process, method, product, or device. The technical proposal of the present disclosure may be applied to control of train operation. The documental series IEC62290 may divide the GOAs of train operation into five grades: GOA0, GOA1, GOA2, GOA3, GOA4. If a definite train runs on a definite track section, factors determining the GOAs of train operation supportable by the track section may lie in three main aspects: whether the track section is exclusive right of way; GOA supportable by the train's controlling of traction system, controlling of brake system, controlling of train door, and onboard signalling control system; operators in charge of operating the railway (e.g., subway operation corporation, tramcar operation corporation, interurban railway operation corporation, mainline railway operation corporation) may select some GOA grades and neglect others out of caution or other considerations about the automatic technology of train operations.

Merely by way of example, GOA2, GOA3, GOA4, which may have automatic control for the train traction and brake system, could not be used for the track section with mixed right of way for preventing traffic accidents. A GOA1 train (traction system and brake system with manual control) may be operated manually on a railway line designed for high density and automation operation, which may affect the transport capacity and punctuality. Moreover, some operators may not adopt the grade GOA3 or GOA4 that are automatic driverless GOA considering non-technical factors such as providing more job opportunities.

In the era of the popularity of rail transit network's interconnection and intercommunication, it is desirable to achieve unified management of GOAs of train operation in cross-line and cross-region operation. The present disclosure may propose a concept of a set of the GOAs of train operation supportable by a track section and a set of the GOAs of train operation supportable by the train itself to embody the determining factors of the GOAs of train operation. The concept may be proposed based on the fact that the GOA of train operation may be a set of limited elements which may be displayed one by one, and that each GOA grade may be one element of the set. More than one GOAs of train operation supportable by the track section and more than one GOAs of train operation supportable by the train itself may be subsets of the set of GOAs of train operation.

Selection of an element from the set of GOAs of train operation supportable by the track section may depend on some factors. The factors may include whether the right of way is shared and operator's preference. Selection of the element of the set of GOAs of train operation supportable by the train itself may depend on the train's controlling of traction system, controlling of brake system, controlling of train door, GOA supportable by onboard signalling control system, or the like. These subsets may be embodied in the form of a set of recording information stored in a memory medium in the control system of train operation.

Detailed description of embodiments of the present disclosure will be described in detail below with reference to the drawings.

(Embodiment 1)

Referring to FIG. 1, the present disclosure may provide a system for controlling GOA of train operation. The system may include an onboard controlling and processing unit 101, an onboard information recording unit 102, an onboard switch of GOA of train operation 103, and an onboard train positioning information acquisition unit 104. Wherein: the onboard information recording unit 102 may be configured to record a set of GOAs of train operation supportable by a current track section where the train is located and a set of GOAs of train operation supportable by the train itself; the onboard switch of GOA of train operation (hereinafter, simply referred to as switch) 103 may be configured to switch a value of GOA of train operation of the train; specifically, the value of GOA of train operation of the train may be switched manually; the onboard train positioning information acquisition unit 104 may be configured to select current positioning information of the train;

the onboard controlling and processing unit 101 may be configured to obtain the current positioning information of the train, obtain the set of GOAs of train operation supportable by the current track section where the train is located based on the current train positioning information, obtain the set of GOAs of train operation recorded in the onboard information recording unit 102 and supportable by the train itself, determine the intersection of the set of GOAs of train operation supportable by the current track section where the train is located and the set of GOAs of train operation supportable by the train itself; and determine a current GOA of train operation relating to the train by determining whether the value of GOA of train operation belongs to the intersection.

Wherein, if the value of GOA of train operation belongs to the intersection, the onboard controlling and processing unit 101 may be specifically used to determine that the value of GOA of train operation corresponding to the current switch position of the onboard switch of GOA of train operation 103 is the current GOA of train operation relating to the train.

If the value of GOA of train operation does not belong to the intersection, the onboard controlling and processing unit 101 may also be used to generate alarm information of abnormality of switch position selection relating to the onboard switch of GOA of train operation 103 of the train. The alarm information may be used to trigger a stop of the train.

Specifically, the onboard controlling and processing unit 101 may obtain, via the onboard train positioning information acquisition unit 104, current positioning information of the train or positioning information of the current track section where the train is located, obtain the set of GOAs of train operation recorded in the onboard information recording unit 102 and supportable by the current track section where the train is located, and obtain the set of GOA of train operation recorded in the onboard information recording unit 102 and supportable by the train itself.

The switch position of the switch 103 and each element of the set of GOAs of train operation may be one-to-one corresponding and the switch position of the switch 103 may be switched manually by the driver or other staff. Switch positions of GAO0, GOA1, GAO2, GOA3, GAO4 may be clearly marked on an operation panel in order that the staff may switch the switch 103 intuitively. The result of switching the switch position of the switch 103 may be that the switch position of the switch 103 may stay on one marked switch position, that is, the switch 103 may select one specific value of the GOA element.

The onboard controlling and processing unit 101 may select information of the value of GOA of train operation corresponding to a current switch position of the onboard switch of GOA of train operation 103 as an element, determine whether the element belongs to the intersection of the above two sets of GOAs of train operation.

Figure 2:
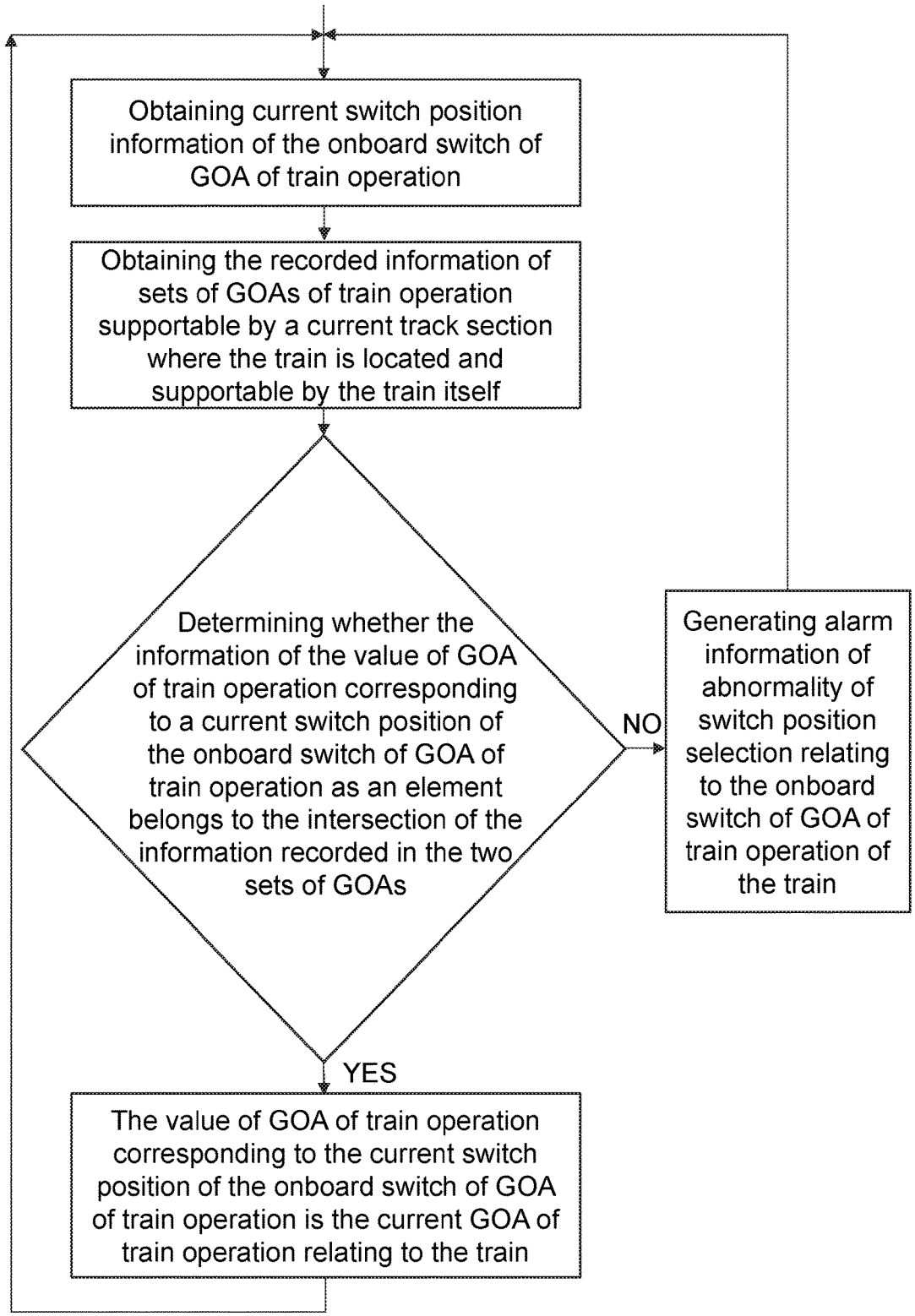
FIG. 2 is a schematic diagram illustrating an exemplary logic determination within the onboard controlling and processing unit according to embodiments of the present disclosure.

Referring to FIG. 2, the embodiments of the present disclosure may provide a schematic diagram of logic determination within the onboard controlling and processing unit of the system and for controlling the GOA of train operation. The process of logical determination may include:

first of all, the onboard controlling and processing unit may obtain relevant information from the onboard train positioning information acquisition unit connected thereto, the onboard information recording unit connected thereto and the switch connected thereto (e.g., physical connection or communication-connection), respectively, which includes: obtaining positioning information of a current track section where the train is located from the onboard train positioning information acquisition unit, obtaining the set of GOAs of train operation supportable by the train itself from the onboard information recording unit, obtaining the set of GOAs of train operation supportable by the current track section where the train is located based on the positioning information, and obtaining a current switch position information of the onboard switch of GOA of train operation from the switch.

Figure 3:
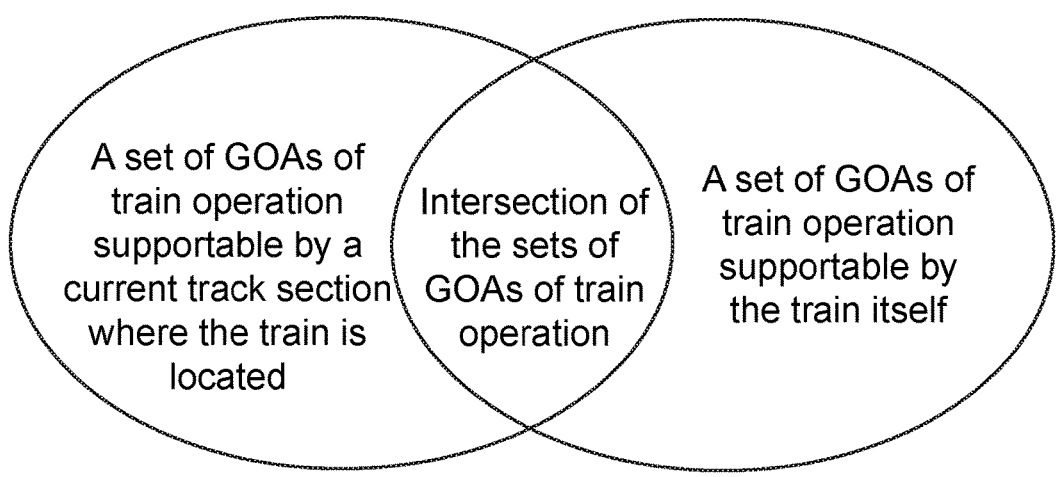
FIG. 3 is a schematic diagram illustrating an exemplary intersection of two sets of GOAs of train operation according to embodiments of the present disclosure.

The onboard controlling and processing unit may determine whether the information of the value of GOA of train operation corresponding to a current switch position of the onboard switch of GOA of train operation as an element belongs to the intersection. As illustrated in FIG. 3, the intersection of the set of GOAs of train operation supportable by the current track section where the train is located and the set of GOAs of train operation supportable by the train itself may be presented.

If the value of GOA of train operation belongs to the intersection, the onboard controlling and processing unit may determine that the value of GOA of train operation corresponding to the current switch position of the onboard switch of GOA of train operation is the current GOA of train operation relating to the train; the train may be under the control of the GOA represented by the value of the GOA of train operation corresponding to the current switch position of the onboard switch of GOA of train operation until a new switch position of switch is set manually;

if the value of GOA of train operation does not belong to the intersection, the onboard controlling and processing unit may generate alarm information of abnormality of switch position selection relating to the onboard switch of GOA of train operation of the train; the alarm information may be embodied as transmitting message with determined format to the outside of the onboard controlling and processing unit, and may also be embodied as that the onboard controlling and processing unit transmits electrical signal with determined format through certain circuit hardware interface, whatever the alarm information may be embodied, the ultimate result may be that the alarm information triggers the service brake system and/or emergency brake system directly or indirectly to stop the train.

It should be noted that that the concept of mathematical set and element may be used to describe the decision logic of the onboard controlling and processing unit, persons having ordinary skill in the art should understand that same effects can be achieved without using the concept of mathematical set and element. For example, the onboard controlling and processing unit may determine whether the value of GOA of train operation corresponding to the current switch position of the onboard switch belongs to a list of the two sets of the GOA of train operation, or other equivalent deterministic processes may also be applied. Other equivalent deterministic processes may be similar to the description above and is not repeated here.

In order to achieve unified management of external trains within the jurisdiction, a specific operator in charge of operating railway line may adopt system with such decision logic for the control system of a train, furthermore, the specific operator may, from a technical perspective, use the system to restrict the GOA of train operation of cross-line or cross-region trains running on the railway line within the operator's jurisdiction.

Figure 4:
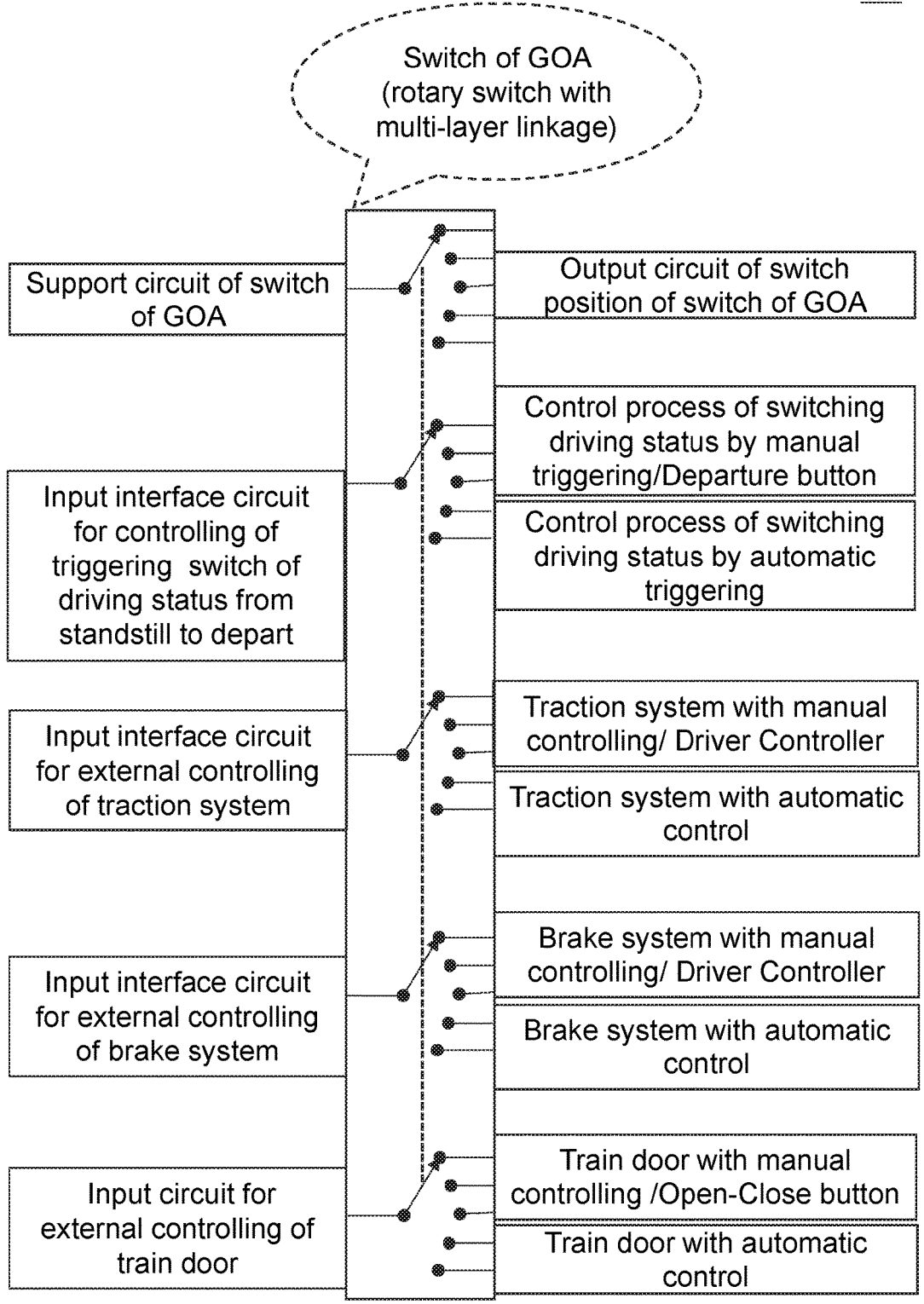
FIG. 4 is a schematic diagram illustrating an exemplary implementation of onboard switch of GOA of train operation according to embodiments of the present disclosure.

Referring to FIG. 4, FIG. 4 is a schematic diagram illustrating an implementation of an onboard switch for GOA of train operation used in a system for controlling GOA of train operation according to embodiments of the present disclosure, the switch may adopt a rotary switch with at least five switch positions representing the GOA0, GOA1, GOA2, GOA3, and GOA4, respectively. The switch may adopt a rotary switch with multi-layer linkage considering difference of detail of GOAs of train operation as described in IEC62290. In order to reach the levels of GOAs of train operation illustrated in the TABLE. 1 (The reason why the difference between the GOA0 and the GOA1 is not shown directly may mainly be that, the function that applying the function of emergency brake by automatically triggering the system of emergency brake is allowed in the GOA1 (and in GOA2-4), but not in GOA0), if the GOA of train operation is switched, the rotary switch with multi-layer linkage may synchronously switch the train's input circuit for switching control of driving status, input circuit for external controlling of traction system, input circuit for external controlling of brake system, and/or input circuit for external controlling of train door.

(Embodiment 2)

Figure 5:
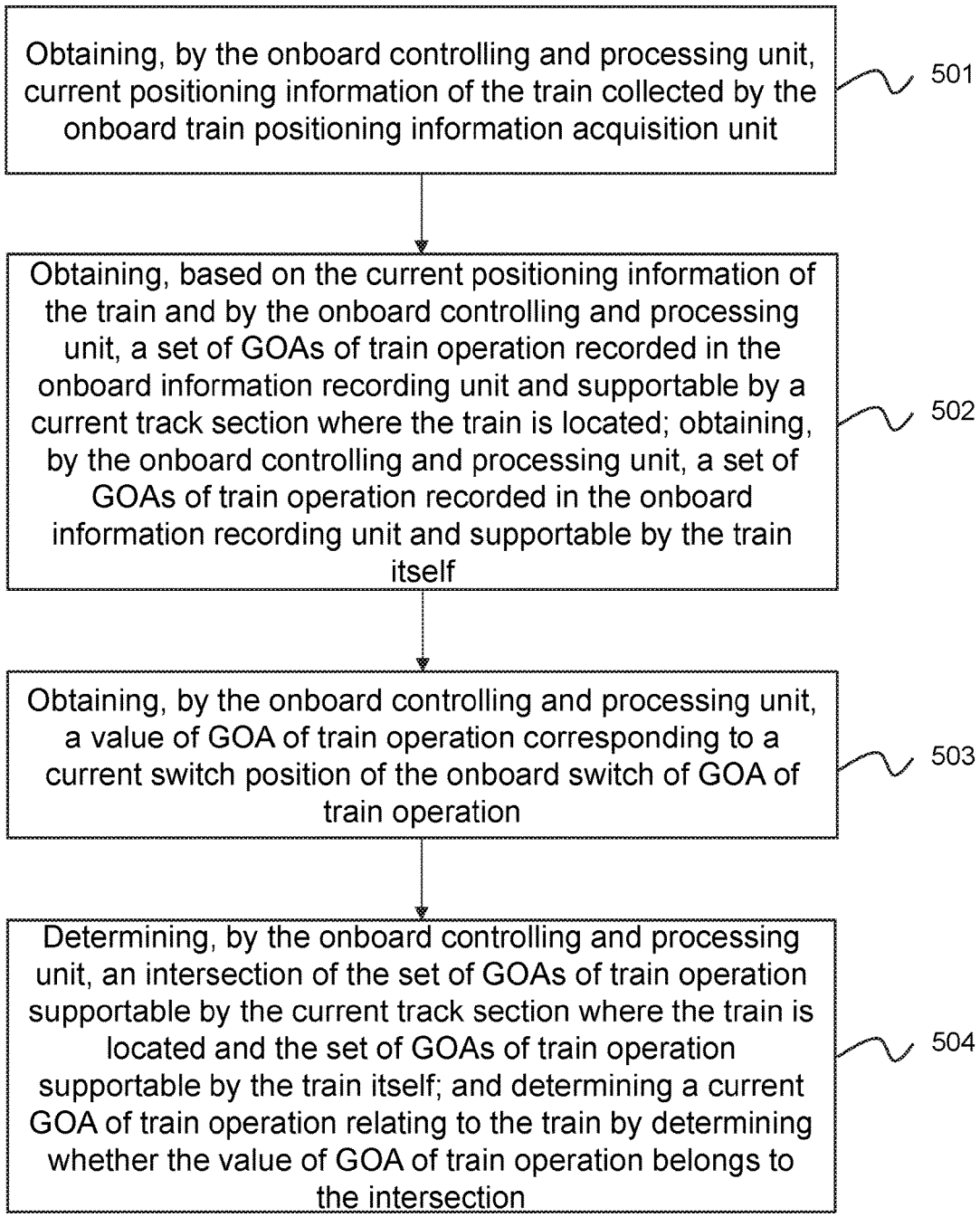
FIG. 5 is a schematic diagram illustrating an exemplary process of controlling GOA of train operation according to embodiments of the present disclosure.
Figure 6:
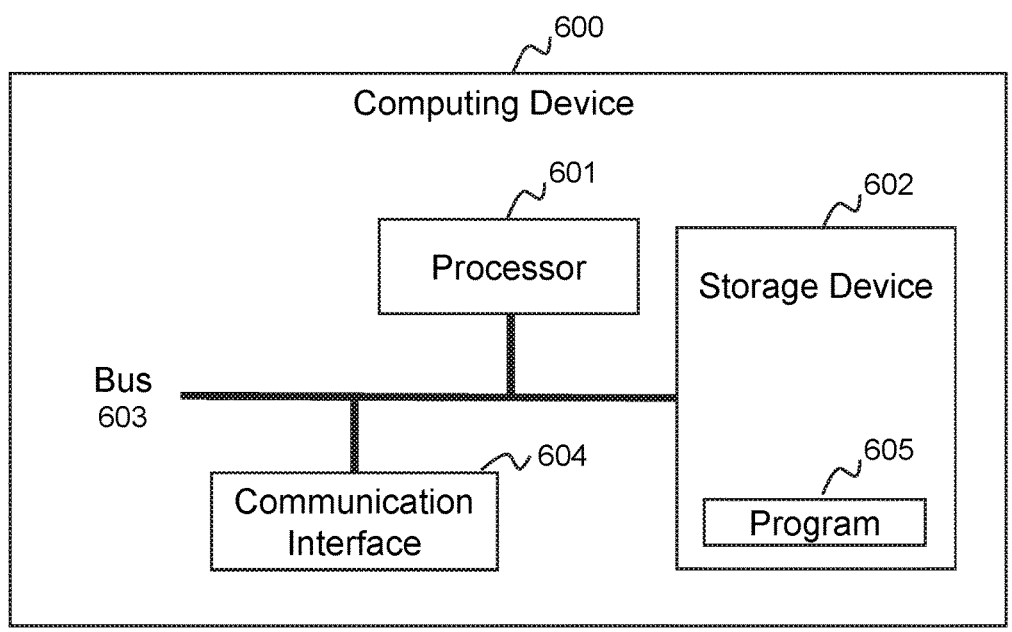
FIG. 6 is a schematic diagram illustrating an exemplary computing device according to embodiments of the present disclosure.

Referring to FIG. 5, the embodiments of the present disclosure may provide a method for controlling GOA of train operation.

Wherein, an onboard controlling and processing unit, an onboard information recording unit, an onboard switch of GOA of train operation, and an onboard train positioning information acquisition unit may be installed on the train, the onboard information recording unit, the onboard switch of GOA of train operation, and the onboard train positioning information acquisition unit may be connected to the onboard controlling and processing unit, respectively; the method may comprise:

in 501, the onboard controlling and processing unit may obtain current positioning information of the train collected by the onboard train positioning information acquisition unit;

in 502, the onboard controlling and processing unit may obtain, based on the current positioning information of the train, a set of GOAs of train operation recorded in the onboard information recording unit and supportable by a current track section where the train is located; the onboard controlling and processing unit may obtain a set of GOAs of train operation recorded in the onboard information recording unit and supportable by the train itself;

in 503, the onboard controlling and processing unit may obtain a value of GOA of train operation corresponding to a current switch position of the onboard switch of GOA of train operation;

in 504, the onboard controlling and processing unit may determine an intersection of the set of GOAs of train operation supportable by the current track section where the train is located and the set of GOAs of train operation supportable by the train itself; and determine a current GOA of train operation relating to the train by determining whether the value of GOA of train operation belongs to the intersection.

TABLE 1

| | GOA0 | GOA1 | GOA2 | GOA3 | GOA4 |
|---|---|---|---|---|---|
| Control of triggering switch of driving status from standstill to depart | Control process of switching driving status by manual triggering/Departure button | Control process of switching driving status by manual triggering/Departure button | Control process of switching driving status by manual triggering/Departure button | Control process of switching driving status by automatic triggering | Control process of switching driving status by automatic triggering |
| Control of train traction | Traction system with manual control/Driver Controller | Traction system with manual control/Driver Controller | Traction system with automatic control | Traction system with automatic control | Traction system with automatic control |
| Control of train brake | Brake system with manual control/Driver Controller | Brake system with manual control/Driver Controller | Brake system with automatic control | Brake system with automatic control | Brake system with automatic control |
| Control of train door | Train door with manual control/Open-Close button | Train door with manual control/Open-Close | Train door with manual control/Open-Close | Train door with manual control/Open-Close | Train door with automatic control |

As noted above, in some viable embodiments of the present disclosure, a technical proposal for determining the current GOA of train operation may be disclosed, which solves the problems of the implementation of technical proposal of GOA of train operation and the unified management of GOA of train operation.

In some embodiments, the determining whether the value of GOA of train operation belongs to the intersection may include: if the value of GOA of train operation belongs to the intersection, determining that the value of GOA of train operation corresponding to the current switch position of the onboard switch of GOA of train operation is the current GOA of train operation relating to the train. In some embodiments, the determining whether the value of GOA of train operation belongs to the intersection may include: if the value of GOA of train operation does not belong to the intersection, generate alarm information of abnormality of the switch position selection relating to the onboard switch of GOA of train operation of the train.

In some embodiments, the alarm information may be used to trigger a stop of the train.

It should be understood that, a function of the embodiments of the present disclosure may be specifically implemented according to the foregoing system embodiments, and for the specific embodiment processes, reference may be made to relevant descriptions in the foregoing system embodiments, and details are not repeatedly described here.

As noted above, in some possible embodiments of the present disclosure, a technical proposal for determining current GOA of train operation may be disclosed, which solves the problems of the implementation of technical proposal of GOA of train operation and the unified management of GOA of train operation.

(Embodiment 3)

Referring to FIG. 5, the embodiments of the present disclosure may also provide a computing device 600. The computing device 600 may include a processor 601, a storage device 602, a bus 603, and a communication interface 604;

The storage device 602 may be used for storing a program 605, the program 605 may include computer-executable instructions, the processor 601 may be connected to the storage device 602 via the bus 603. When the computing device 600 runs, the processor 601 may execute the program 605 stored in the storage device 602 to cause the computing device 600 to effectuate the methods for controlling GOA of train operation as described in the foregoing method embodiments.

(Embodiment 4)

A computer-readable medium may store one or more programs. The one or more programs may include a program. When executed by a computing device including one or more processors, the instruction may cause the computing device to effectuate the methods for controlling GOA of train operation as described in the foregoing method embodiments.

In the embodiments above, the description of each embodiment may focus on different parts, some parts may be not described in detail in one embodiment and may refer to related descriptions in other embodiments.

It should be noted that the foregoing method embodiments have been described as a series of combinations of steps for convenience of the descriptions, but persons having ordinary skill in the art should understand that the present disclosure will not be limited to the described sequence of steps because some of the steps can be performed in a different sequence or concurrently according to the present disclosure. The persons having ordinary skill in the art should understand that embodiments described in the specification are preferred embodiments, and the units or processes of the embodiments may be not necessary for implementing the present disclosure.

It is clear to persons having ordinary skill in the art that specific processes of the above described systems, devices and units may refer to the corresponding processes of the method embodiments described above, and are not repeatedly described herein.

In the embodiments provided in the present disclosure, it should be understood that the disclosed systems, devices, and methods may be implemented in other manners. For example, the device embodiments described herein are provided for example purposes only, such as, unit division is merely logic division and other division manners may be used for practical implementations, for example, the various elements or components may be combined or integrated into another system or certain features may be omitted or not implemented. In addition, displayed or discussed mutual coupling, direct coupling, or a communication connection may be indirect coupling or a communication connection through some interfaces, apparatuses, or units, and may be electrical, mechanical, or in other forms.

The units displayed as separate parts may be or may be not physically separate. The parts displayed as units may be or may be not physical units, that is may be located in a single position or may be distributed among a plurality of network units. Part or all of the units herein may be selected according to a practical need to achieve the objectives of the solutions of the embodiments of the present disclosure.

Besides, each functional unit of various embodiments of the present disclosure may be integrated into one processing unit or each functional unit may exist physically and separately, or two or more units may be integrated into one unit. The integrated unit may be implemented in a form of hardware, or may be implemented in a form of a software functional unit.

If the integrated unit is implemented in the form of software functional units and functions as an independent product for sale or use, it may be stored in a computer-readable storage medium. Based on this understanding, the substance of the technical proposal of the present disclosure, or the part contributing to the advance of the prior art, or all or part of the technical proposals may be embodied in the form of a software product. The computer software product may be stored in a storage media. The computer software product may include instructions to cause a computer device (which may be a personal computer, a server, or a network device, etc.) to execute all or parts of steps of some embodiments of the present disclosure. The above-mentioned storage device may include U disk, mobile hard disk, Read-Only Memory (ROM), Random Access Memory (RAM), magnetic disks, or optical disks and various mediums capable of storing program codes.

The methods and systems for controlling GOA of train operation provided by the present disclosure have been described above in detail, and specific examples are used herein to illustrate the principles and embodiments of the present disclosure, which are only used to help understand the methodology and concept of the present disclosure. For persons having ordinary skill in the art, numerous changes in details of embodiments and applications may be resorted to without departing from the spirit and scope of the present disclosure, this specification should not be interpreted as limitations on the scope of the present disclosure.

What is claimed is:

1. A method for controlling grade of automation (GOA) for operation of a train, wherein:
   an onboard controlling and processing unit, an onboard information recording unit, an onboard switch of GOA of train operation, and an onboard train positioning information acquisition unit are installed on the train, the onboard information recording unit, the onboard switch of GOA of train operation, and the onboard train positioning information acquisition unit are connected to the onboard controlling and processing unit, respectively, and the method comprises:
   obtaining, by the onboard controlling and processing unit, current positioning information of the train collected by the onboard train positioning information acquisition unit;
   obtaining, based on the current positioning information of the train and by the onboard controlling and processing unit, a first set of GOAs of train operation recorded in the onboard information recording unit and supportable by a current track section where the train is located;
   obtaining, by the onboard controlling and processing unit, a second set of GOAs of train operation recorded in the onboard information recording unit and supportable by the train;
   obtaining, by the onboard controlling and processing unit, a value of GOA of train operation corresponding to a switch position of the onboard switch of GOA of train operation;
   determining, by the onboard controlling and processing unit, an intersection of the first set of GOAs and the second set of GOAs; and
   determining a current GOA of train operation relating to the train by determining whether the value of GOA of train operation belongs to the intersection.

2. The method of claim 1, further comprising:
in response to the determination that the value of GOA of train operation belongs to the intersection,
determining that the value of GOA of train operation corresponding to the switch position of the onboard switch of GOA of train operation is the current GOA of train operation.

3. The method of claim 1, further comprising:
in response to the determination that the value of GOA of train operation does not belong to the intersection,
generating alarm information of abnormality of switch position selection relating to the onboard switch of GOA of train operation of the train.

4. The method of claim 3, wherein the alarm information is configured to trigger a stop of the train.

5. A system for controlling grade of automation (GOA) for operation of a train, comprising:
   an onboard controlling and processing unit, an onboard information recording unit, an onboard switch of GOA of train operation, and an onboard train positioning information acquisition unit,
   wherein the onboard information recording unit, the onboard switch of GOA of train operation, and the onboard train positioning information acquisition unit are connected to the onboard controlling and processing unit, respectively, and wherein
     the onboard information recording unit is configured to record a first set of GOAs of train operation supportable by a current track section where the train is located and a second set of GOAs of train operation supportable by the train;
     the onboard switch of GOA of train operation is configured to switch a value of GOA of train operation of the train;
     the onboard train positioning information acquisition unit is configured to collect current positioning information of the train;
     the onboard controlling and processing unit is configured to obtain the current positioning information of the train and obtain, based on the current positioning information of the train, the first set of GOAs;
     the onboard controlling and processing unit is configured to obtain the second set of GOAs and determine an intersection of the first set of GOAs and the second set of GOAs; and
     the onboard controlling and processing unit is configured to determine a current GOA of train operation relating to the train by determining whether the value of GOA of train operation belongs to the intersection.

6. The system of claim 5, wherein the onboard controlling and processing unit is specifically configured to:
   in response to the determination that the value of GOA of train operation belongs to the intersection,
   determine that the value of GOA of train operation corresponding to a switch position of the onboard switch of GOA of train operation is the current GOA of train operation relating to the train.

7. The system of claim 5, wherein the onboard controlling and processing unit is specifically configured to:
   in response to the determination that the value of GOA of train operation does not belong to the intersection,
   generate alarm information of abnormality of switch position selection relating to the onboard switch of GOA of train operation of the train.

8. The system of claim 7, wherein the alarm information is configured to trigger a stop of the train.

9. The system of claim 5, wherein:
   the onboard switch of GOA of train operation is further configured to synchronously switch at least two of the train's input circuit for switching control of driving status, input circuit for external controlling of traction system, input circuit of external control of brake system, or input circuit of external control of train door.

10. A computing system, wherein:
    the computing system comprises a processor, a storage device, a bus, and a communication interface;
    the storage device stores a program, the program includes computer-executable instructions, the processor is connected to the storage device via the bus; and
    when the computing device runs, the processor executes the program stored in the storage device to cause the computing device to effectuate the method of claim 1.

11. A computer-readable medium storing one or more programs, the one or more programs including an instruction, when executed by a computing device including one or more processors, the instruction causes the computing device to effectuate the method of claim 1.

12. The method of claim 1, further comprising:
   synchronously switching, by the onboard switch of GOA of train operation, at least two of the train's input circuit for switching control of driving status, input circuit for external controlling of traction system, input circuit for external controlling of brake system, or input circuit for external controlling of train door.

* * * * *